(12) United States Patent
Bacher et al.

(10) Patent No.: US 6,883,953 B1
(45) Date of Patent: Apr. 26, 2005

(54) APPARATUS FOR PRE-TREATMENT AND SUBSEQUENT PLASTIFICATION OR AGGLOMERATION OF SYNTHETIC PLASTIC MATERIALS

(76) Inventors: Helmut Bacher, Bruck/Hausleiten 17, St. Florian (AT), A-4490; Helmuth Schulz, Badstrasse 20, St. Florian (AT), A-4490; Georg Wendelin, Waldbothenweg 84, Linz (AT), A-4033

( * ) Notice: Subject to any disclaimer, the term of this patent is extended or adjusted under 35 U.S.C. 154(b) by 66 days.

(21) Appl. No.: 10/130,814
(22) PCT Filed: Sep. 29, 2000
(86) PCT No.: PCT/AT00/00258
§ 371 (c)(1), (2), (4) Date: May 20, 2002
(87) PCT Pub. No.: WO01/39948
PCT Pub. Date: Jun. 7, 2001

(30) Foreign Application Priority Data
Dec. 2, 1999 (AT) .............................................. 2033/99

(51) Int. Cl.⁷ .............................. B29B 7/42; B29B 7/44
(52) U.S. Cl. ..................... 366/76.1; 366/77; 366/155.1; 366/186; 241/186.5
(58) Field of Search ................................ 366/50, 76, 1, 366/77, 155.1, 89, 156.1, 186, 194; 241/186.5; 425/202, 205

(56) References Cited

U.S. PATENT DOCUMENTS

| | | | | |
|---|---|---|---|---|
| 3,762,693 A | * | 10/1973 | DeBoo et al. | 366/81 |
| 3,822,057 A | * | 7/1974 | Wheeler | 366/76.2 |
| 4,222,728 A | * | 9/1980 | Bacher et al. | 425/305.1 |
| 4,460,277 A | * | 7/1984 | Schulz et al. | 366/76.3 |
| 4,894,001 A | * | 1/1990 | Petschner | 425/200 |
| 5,102,326 A | * | 4/1992 | Bacher et al. | 425/202 |
| 5,651,944 A | * | 7/1997 | Schulz et al. | 422/137 |
| 5,783,225 A | * | 7/1998 | Bacher et al. | 425/202 |
| 5,988,865 A | * | 11/1999 | Bacher et al. | 366/76.93 |
| 6,619,575 B1 | * | 9/2003 | Bacher et al. | 241/46.11 |

FOREIGN PATENT DOCUMENTS

EP 0 390 873 B1 * 5/1992
WO WO 01/21372 * 3/2001

* cited by examiner

Primary Examiner—David Sorkin
(74) Attorney, Agent, or Firm—Townsend and Townsend and Crew LLP

(57) ABSTRACT

An apparatus for pre-processing and subsequent plastification or agglomeration of synthetic plastic materials, in particular thermoplastic waste plastics for recycling purposes, has a receptacle (1) in which at least one comminuting tool (6) circulates. The housing (7) of a screw (8) is connected to the receptacle (1). The diameter (D) of the receptacle (1) has the following relationship to the screw diameter (d):

$$D = 10 \cdot \sqrt[3]{K \cdot d^2}, \text{ wherein}$$

D is the inner diameter of the receptacle in mm,
d is the screw diameter in mm and
K is a dimension-less constant which amounts to at least 190.

Thereby the dwell times of the synthetic plastic material within the receptacle (1) are kept at optimal values.

13 Claims, 3 Drawing Sheets

APPARATUS FOR PRE-TREATMENT AND SUBSEQUENT PLASTIFICATION OR AGGLOMERATION OF SYNTHETIC PLASTIC MATERIALS

BACKGROUND OF THE INVENTION

The invention refers to an apparatus for pre-treatment and subsequent plastification or agglomeration of synthetic plastic materials, in particular thermoplastic waste plastics for recycling purposes, comprising a receptacle that has an intake opening for the material to be processed and in which at least one circulating comminuting and/or mixing tool is disposed, whereby the material processed within the receptacle is fed into the housing of a screw plasticizing or agglomerating this material, for example an extruder screw, which housing preferably is connected to the receptacle.

Apparatus of this kind are known in many embodiments. The pre-treatment of the synthetic plastic material to be processed mostly is a comminuting action which, however, can be also replaced by or can be combined with mixing and/or drying and/or heating and/or crystallizing and/or densifying of the material. In most apparatus of this kind, the tools revolving within the receptacle press the pre-processed material directly into the housing of an extruder screw, which housing is connected to the receptacle. However, apparatus are also known in which the material leaving the receptacle first enters a tube in which a conveying screw may be disposed. The material fed by this horizontally or vertically directed tube then reaches the housing of an extruder screw by which the material is finally plasticized.

The screw length of a usual plasticizing screw can roughly be subdivided into three zones: namely the intake zone neighboring the intake opening, then the compression or melting zone following the intake zone, and lastly the subsequent dosing discharging or metering zone. Usually, the depth of the volutions of the screw in the metering zone is less than the depth of the volutions in the intake zone, whereby the material being still loosely within the intake zone, for example material in the form of flakes, is more and more compressed over the course of the screw length. For processing of commercial plastics, for example polyethylene, commercial extruders have a depth of the volutions in the metering zone of about 5% of the screw diameter.

Most of these known constructions do not meet the requirements with respect to the quality of the processed synthetic plastic material obtained at the exit of the screw and/or with respect to the yield of the screw. Investigations have shown that the requirements to the screw following the receptacle, mostly a plasticizing screw, are not constant during the operation and that this can be explained by the fact that some portions of the processed material remain for a longer time within the receptacle than other portions. The mean dwell time of the material within the receptacle can be calculated by the filling weight within the receptacle divided by the output of the screw per time unit. This mean dwell time, however, as already mentioned, is as a rule not fulfilled for big portions of the material to be processed, but there occur irregular substantial positive and negative deviations from this mean value. These deviations can be caused by different properties of the material batches introduced step by step into the receptacle, for example different quality or different thickness of the synthetic plastic material, for example foil rests and the like, however, also by uncontrollable random events.

For thermically and mechanically homogeneous material an improvement of the quality of the material obtained at the exit of the screw is attained if the depth of the volutions of the screw in the metering zone is very great and the revolution speed of the screw is kept very low. Investigations have shown that this can be explained by the fact that the processed material is subjected to a low shearing action by such a screw geometry. The shearing of a processed material (shearing speed) can be calculated by the speed of the periphery of the screw divided by the depth of the volutions of the screw. With such a screw geometry, the material is only slightly mechanically and thermically stressed so that the molecule chains of the synthetic plastic material are not or not substantially adversely affected.

If, however, it is important to increase the output of the screw or, for example, the performance of a shredder-extruder combination, then the revolution speed of the screw must be increased, and this means that also the shearing effect is increased. However, the processed material is thereby subjected to higher mechanical and thermical stresses by the screw; i.e. there is the danger that the molecule chains of the synthetic plastic material are adversely affected. As a further disadvantage, there occurs more wear of the screw and its housing, in particular when processing recycling material due to the impurities contained within this material, for example abrasive particles, metal pieces or the like, which have a high wear effect on the metal elements of the screw and its bearings sliding along each other.

With a slowly rotating and deeply cut screw (great depth of the volutions) as well as with a quickly rotating screw, the already mentioned different quality of the single material batches supplied to the screw, for example different flake sizes and/or different temperature of the synthetic plastic material, have an adverse effect in view of inhomogeneities of the synthetic plastic material at the screw exit. In order to equalize these inhomogeneities, in practice, the temperature profile of the extruder is increased, and this means that additional power must be supplied to the synthetic plastic material, which has as a result the mentioned thermic damages of the synthetic plastic material and an increased power consumption. Further, the viscosity of the plastic material obtained at the extruder exit is reduced thereby, so that this material is very fluid, which causes difficulties when further processing this material.

Therefrom it can be seen that the processing parameters favorable to obtain a good material quality at the exit of the screw are in contradiction to each other.

SUMMARY OF THE INVENTION

Accordingly, it is an object of the invention to overcome these disadvantages and to improve an apparatus of the initially described kind so that this apparatus can be operated with a higher screw output, at a constant material quality, or, respectively, that, when keeping the screw output constant, the temperature profile of the extruder can be kept substantially lower, for example up to 20° C. lower, which means power saving and a better quality of the material obtained.

The invention starts from findings obtained by investigations that the theoretical dwell time of the plastic material to be processed within the receptacle is of substantial influence, in particular if this material is present in a form that is difficult to process. If one succeeds in increasing the mechanical and thermic homogeneity of the synthetic plastic material within the receptacle, then this has a direct favorable influence on the quality of the plastificate or agglomerate, because the screw is already supplied with material of at least substantially constant mechanical and thermic homogeneity, so that such a homogeneity must not still be worked up by the screw. In other words and simplified: the more the quality of the pre-treatment of the synthetic plastic material within the receptacle can be increased, the fewer problems occur during the subsequent processing (plastification or agglomeration) of the synthetic plastic material within the screw housing. The investigations have shown the surprising result that the task mentioned above can be solved according to the invention in a simple manner by keeping the diameter of the receptacle in the following relationship to the diameter of the screw:

$$d = 10 \cdot \sqrt[3]{K \cdot d^2}, \text{ wherein}$$

D is the inner diameter of the circular-cylindrical receptacle in mm or the inner diameter in mm of a fictitious receptacle having the same capacity and the same height d is the screw diameter in mm and K is a dimension-less constant which is greater than or equal to 190.

The formula is a rule of thumb which was empirically found by tests. Therefore, it is immaterial if different dimensions occur on both sides of the equal sign.

By the increase of the receptacle (mostly a shredder receptacle), when compared with usual sizes, it is found that the mechanical and thermic homogeneity of the synthetic plastic material pre-processed within the receptacle is made more uniform, even if this material is difficult to process. The reason for this is that the mass ratio between the constantly supplied unprocessed "cold" material portions and the material mass present within the container and already partially treated is lower when compared with the usually occurring conditions, and that the main dwell time of the synthetic plastic material within the container is substantially increased. This decrease of the mass ratio has a favorable influence upon the thermic and mechanical homogeneity of the material entering the screw housing from the container and, therefore, directly upon the quality of the plastificate or of the agglomerate at the end of the extruder screw or of the agglomerating screw, because the theoretical dwell time of the processed synthetic plastic material within the container becomes substantially constant. Further, such a plant having an increased receptacle can be more easily operated with respect to the exactness of the supplied portions when compared with the known plants.

For example, the following values result for a shredder receptacle of the usual construction when processing polyethylene foils having an average melt-flow index (MFI) of 0.5, an average foil thickness s of $80\mu$ and an average pile weight Sg in the shredder receptacle of 0.225 kg/dm$^3$:

| | |
|---|---|
| shredder receptacle diameter | D = 1000 mm |
| shredder receptacle height | H = 1000 mm |
| screw diameter | d = 80 mm |
| screw length | l = 1600 mm |
| material (flakes) processed within the shredder receptacle | Zi = 38 kg |
| extruder output | Ea = 320 kg/h |

Therefrom the theoretical dwell time of the material within the receptacle can calculated Zi: Ea=38:320=0, 12 h=7.13 min.

According to the formula given above, this usual construction corresponds to a value of K=157.

If according to the invention the receptacle's diameter and height are increased to 1300 mm and, besides this, the construction remains unchanged, this results in:

| | |
|---|---|
| shredder receptacle diameter | D = 1300 mm |
| shredder receptacle height | H = 1300 mm |
| screw diameter | d = 80 mm |
| screw length | l = 1600 mm |
| material (flakes) processed within the shredder receptacle | Zi = 83 kg |
| extruder output | Ea = 385 kg/h |

Therefrom the theoretical dwell time can be calculated: i:Ea=83:385=0,22 h=12,94 min.

This construction corresponds to a value of K=343.

If one compares the two values of the theoretical dwell time, this results in an increase of the dwell time by a factor of 1.81. This results in an increase of the output by a factor of about 1.2 (the screw speed of 160 rpm being unchanged). A mean dwell time increase to 83%, therefore, results in an increase of the output of 20%.

For a selected K value of 343, the formula given above results in the following receptacle diameters D (in mm) for usual given screw diameters d (in mm):

| screw diameter (mm) | receptacle diameter (mm) |
|---|---|
| 50 | 950 |
| 85 | 1353 |
| 105 | 1558 |
| 120 | 1703 |
| 145 | 1932 |

If value is set on an additional increase of the output or on an improved capacity of the shredder-extruder combination, then, within extruders of the same size, therefore, with a screw diameter of the same size, the depth of the screw volution can be increased and the speed of the screw can be increased without the processed material being subjected to an increased shearing action within the screw. This means also that the mass temperature of the plastificate and, therefore, also the entire power consumption for processing is decreased. In particular when processing thermically unstable thermoplasts, this is of importance. Therefore, the use of an increased receptacle volume enables one not only to increase the output of the shredder-extruder combination by more than 50%, when compared with constructions usual heretofore, but also to considerably save power. For example, the enthalpy-curve of polyethylene having a density of 0.92 g/cm$^3$ shows a saving of melting power (at a processing temperature decreased for 20° C.) of 25 W/kg, i.e. almost a 14.5% power saving.

An increase of the receptacle height (the diameter being unchanged) indeed results in an increase of the volume of the receptacle. This however does not practically result in an improvement of the quality of the processed material. The reason for this is that by the influence of the tools revolving within the receptacle, the circulating material becomes a shape (mixing cone) that does not exceed a certain height; i.e. the synthetic plastic material circulating along the receptacle wall reaches a maximum height and then falls back inwardly and downwardly into the central region of the receptacle. For these reasons, usually, the receptacle height is chosen equal to the receptacle diameter.

As already mentioned, however, the receptacle must not necessarily have a circular cylindrical shape, even if this shape is of advantage for practical and manufacturing technical reasons. Shapes of the receptacle deviating from the circular cylindrical shape, for example, frusto-conical shaped receptacles or cylindrical receptacles having an elliptic or oval horizontal projection, must be converted to a circular cylindrical receptacle of the same capacity, on the assumption that the height of this fictitious receptacle is equal to its diameter. Heights of the receptacle substantially exceeding the occurring mixing cone (considering the save distance) remain unconsidered because these excessive receptacle heights are not made use of and, therefore, have no influence upon processing the material.

Theoretically, the increase of the receptacle has no upper limit. In practice, however, this limit is given by manufacturing reasons and transport reasons. However, investigations have shown that particular favorable constructions are obtained if K is greater than 200.

In an analogous manner, the depth of the volutions of the screw cannot be increased at will, because the remaining core diameter of the screw must be able to take up the torque applied to the screw. Within this, problems may arise with a construction in which the axis of the screw is disposed tangentially with respect to the cross-section of the receptacle, the housing of the screw having in its side wall an intake opening for the material that has to be taken up by the screw, the screw on its one front end being connected to a drive means and on its other front end conveying towards an exit opening, in particular an extruder head, disposed at the front end of the screw housing. With such a construction, of course, it is desired to keep the depth of volutions of the screw within the region of the intake opening of the screw housing as great as possible in order to improve the intake behavior of the screw. This, however, is limited by the grounds mentioned above. Within the spirit of the invention, however, there is the possibility to correspond to these demands that are in contradiction to each other by a special construction. This construction consists in that the screw housing in the region of its intake opening forms a pocket constituting an additional free space for synthetic plastic material that has to be introduced into the screw housing, wherein at that edge of the intake opening at which the direction of rotation of the screw is directed towards the connected receptacle, a preferably adjustable rib is provided which closes this pocket entirely or partially with respect to the intake opening. In this manner, namely despite the reduced volution depth of the screw, a better intake behavior of the screw can be obtained.

However, within the spirit of the invention it is also possible to dispose the axis of the screw radially or like a secant with respect to the cross-section of the receptacle, for example within agglomerating apparatus in which the volution depth of the screw decreases towards the exit opening of the screw housing. As is well known, agglomerating apparatus, when compared with plasticizing apparatus, have a reduced screw length. The volution geometry of an agglomerating screw differs from the volution geometry of a plasticizing screw. The agglomerating screw in the region of the intake zone and in the region of the central zone adjoining it has an increased volution depth, when compared to usual plasticizing screws. Only in the region of the dosing metering zone is the volution depth of the agglomerating screw low, so that the material is intensely compressed and subjected to a shearing action only in the region of the metering zone and, therefore, only for a short time without being plasticized. The agglomerating screw, therefore, delivers on its exit material which is not completely plasticized, but consists of particles melted only at their surface, which particles in the manner of a sintering action adhere to each other.

Further features and advantages of the invention can be seen from the description of exemplative embodiments of the subject matter of the invention, schematically shown in the drawings.

DESCRIPTION OF THE PREFERRED EMBODIMENTS

Figure 1:
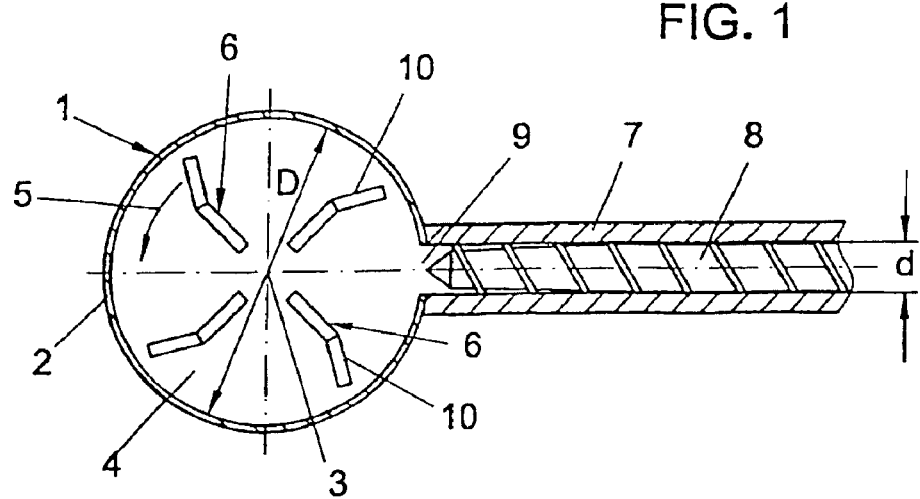
FIG. 1 shows a horizontal section through a first embodiment having a screw housing that is radially connected with respect to the receptacle.

The drawings, for space reasons, are not true to scale, because in reality the receptacles are always much bigger than they are shown in the drawing.

In the embodiment according to FIG. 1 the apparatus, forming a shredder-extruder combination, comprises a receptacle 1 having a circular cross-section, the side wall 2 of it being substantially cylindrical. Within the receptacle 1 a carrier disc 4 rotates around a central vertical axis 3, which disc is driven from below by a drive means (not shown) so that it rotates in the direction of the arrow 5. The carrier disc 4 is disposed in the bottom region of the receptacle 1 and carries on its top surface a plurality of comminuting and mixing tools 6 acting on the synthetic plastic material to be processed, which is introduced into the receptacle from above, as a rule thermoplastic recycling material, in a comminuting and mixing manner. Substantially at the level of these circulating tools 6, the housing 7 of a screw 8 is radially connected to the side wall 2 of the receptacle 1, which screw is driven for rotation around its axis 11 by means of a drive means (not shown) disposed at the right end of the screw. In the present case, the screw is an extruder screw plasticizing the synthetic plastic material that is supplied to the screw 8 through the intake opening 9 of the housing 7, and conveying this material in a plasticized condition to an extruder head (not shown) disposed at the right end of the screw 8. In order to favor the intake of the synthetic plastic material circulating within the receptacle 1 due to the influence of the circulating tools 6 in the form of a mixing cone rising along the wall 2 of the receptacle 1, into the intake opening 9, the preceding working edges 10 of the tools 6 may be so bent that when each tool 6 passes the intake opening 9, the synthetic plastic material is pressed into the intake opening 9 in a spatula-like manner.

In order to obtain optimal conditions with respect to the dwell time of the plastic material within the receptacle 1 for pre-comminuting, pre-drying and pre-heating of the synthetic plastic material, the diameter D of the receptacle 1 is in the following relationship to the outer diameter d of the screw volutions: $D = 10 \cdot \sqrt[3]{K \cdot d^2}$, wherein D is the inner diameter of the receptacle in millimeters, d is the screw diameter in millimeters and K is a constant, which constant amounts to at least 190.

Figure 2:
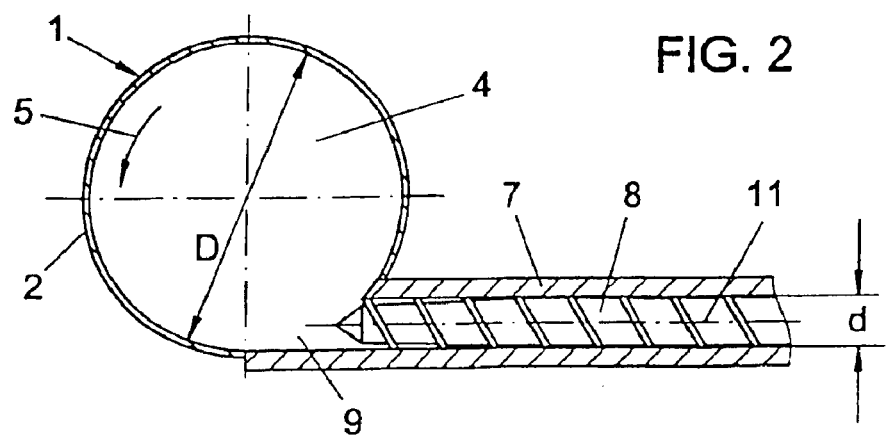
FIG. 2 shows in a similar manner as FIG. 1 a variant of the embodiment in which the axis of the screw hits the cross-section of the receptacle like a secant.

The embodiment according to FIG. 2 differs from that according to FIG. 1 only in that the housing 7 of the screw 8 is not radially connected with respect to the cross-section of the receptacle 1 (as within FIG. 1), but in the manner of a secant to the side wall 2 of the receptacle 1. The elongation axis 11 of the screw 8, therefore, intersects the interior of the receptacle 1. This has as a consequence that—when measured in the peripheral direction of the receptacle 1—the intake opening 9 is wider than in the embodiment according to FIG. 1, which favors the introduction of the material to be processed into the housing 7 of the screw 8.

Figure 3:
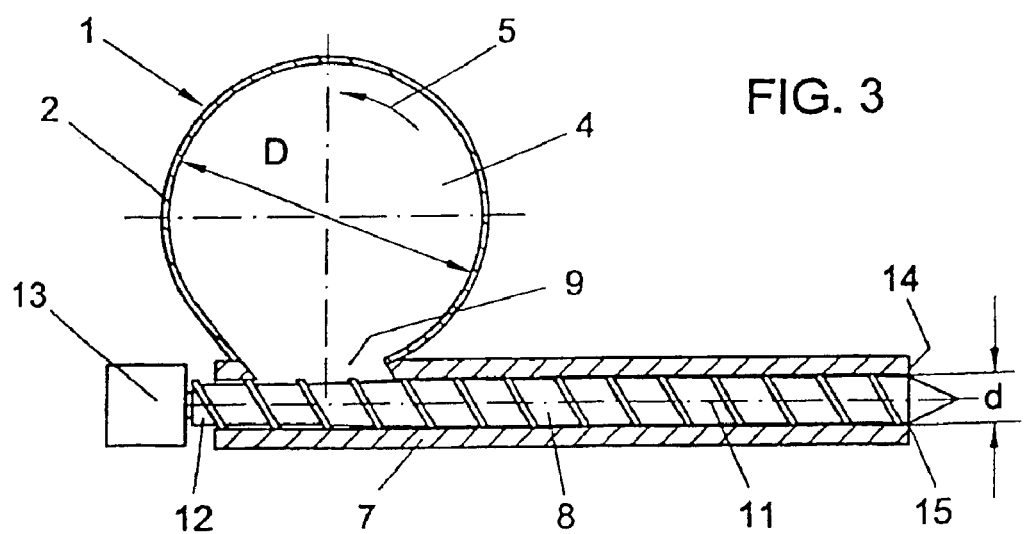
FIG. 3 shows a further embodiment in which the screw housing is tangentially connected to the receptacle.

In the embodiment according to FIG. 3, the housing 7 of the screw 8 is connected tangentially to the side wall 2 of the receptacle 1, so that the intake opening 9 is disposed in the side wall of the housing 7 and not at the front end thereof, as is the case within the embodiments according to FIGS. 1 and 2. Such an embodiment according to FIG. 3 has the advantage that the screw 8 can be driven at its left-hand front end 12 by a drive means 13 that is only schematically shown, so that the right-hand front end 14 of the screw 8 can be kept free from the drive means. This enables one to place the exit opening 15 for the plasticized or agglomerated synthetic plastic material conveyed by the screw 8 at this front end 14, for example, in the form of an extruder head, not shown. Therefore, the synthetic plastic material can be conveyed by the screw 8 through the exit opening 15 without any deviation, which is not easily possible within the embodiments according to FIGS. 1 and 2.

The tools 6 formed as knives or the like are not shown in FIGS. 2 and 3, for clarity sake.

In all embodiments, the core diameter of screw 8 increases towards the exit end of the screw and, therefore, its volution depth decreases in the same direction. However, there may be also the inverse construction, if this is desired, and by the different connection of the screw housing 7 to the receptacle 1 there results a different disposition of the drive means 13 for the screw, as already mentioned. Therefore, the drive means can be disposed neighboring that zone in which the core diameter of the screw must take up the highest torque.

The core diameter or, respectively, the volution depth of the screw in its intake zone must in most cases be adapted to the circumstances given, in particular to the bulk density of the synthetic plastic material contained within the receptacle 1.

Figure 4:
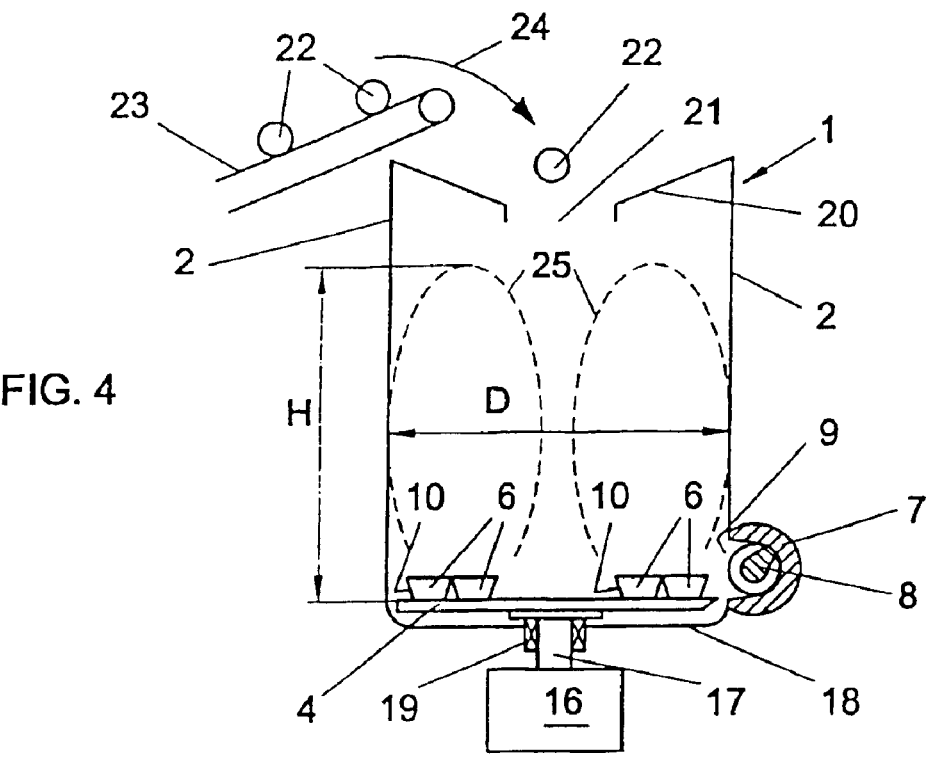
FIG. 4 is a vertical section through a receptacle provided with one single rotating disc carrying the tools.

The embodiment according to FIG. 4 shows a receptacle 1, the effective height H of which is substantially equal to its inner diameter D. The carrier disc 4 is driven by a motor 16 via a shaft 17 that intersects the planar bottom 18 of the receptacle 1 and is bearingly supported in the bottom 18 by means of a bearing 19 that is only schematically shown. The receptacle 1 has an intake opening 21 confined by a hopper 20, through which the material 22 to be processed, for example portions of plastics foils, is thrown in in the direction of the arrow 24 by a conveyor means 23. This material 22 is taken up by the circulating tools 6 and is whirled up in the form of a mixing cone 25, whereby the material rises along the vertical side wall 2 of the receptacle, and again falls back inwardly and downwardly into the central zone of the receptacle by gravity action substantially in the zone of the effective receptacle height H. It is of advantage that an increase of the receptacle size in the sense of the invention increases the average dwell time of the material in the receptacle 1 so that material having a substantial constant thermic and mechanical condition always enters the intake opening 9 of the screw housing 7, even for materials that are difficult to process, for example foil rests of different kinds (thickness, size and the like).

Figure 5:
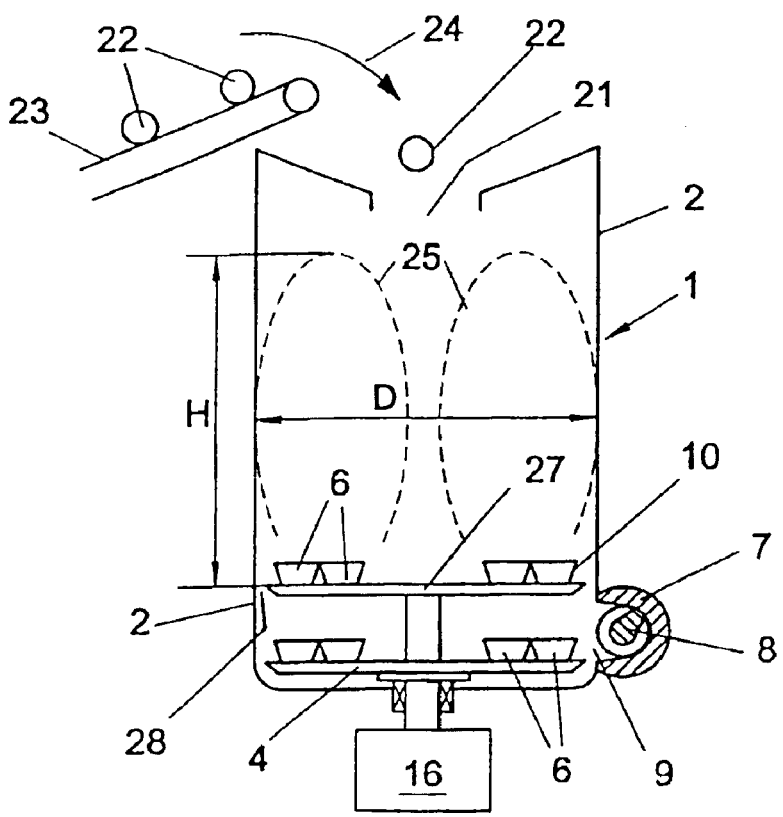
FIG. 5 shows a similar vertical section through a receptacle provided with two such discs carrying tools.

The embodiment according to FIG. 5 differs from that of FIG. 4 in that above the carrier disc 4 for the tools 6 there is still a further carrier disc 27 connected to the shaft 17 coaxially with respect to the carrier disc 4. This carrier disc 27 also carries tools 6. Its construction and disposition may be equal to those of the carrier disc 4. However, the tools 6 may also be mere stuffing tools pressing the synthetic plastic material into the intake opening 9. The carrier disc 27 effects a pre-processing of the synthetic plastic material 22 introduced into the receptacle 1, which material may only after this pre-processing pass an annular gap 28 between the periphery of the carrier disc 27 and the side wall 2 of the receptacle 1 to reach the zone of the lower carrier disc 4, whereby the thermic and mechanical homogeneity of the synthetic plastic material pre-processed within the receptacle 1 is further improved, which material is then introduced into the housing 7 of the screw 8. Within this, the carrier disc 4 with its tools 6 guides the further processed synthetic plastic material into the intake opening 9 of the screw housing 7.

In this case, the effective height H of the receptacle 1 must be calculated from the upper carrier disc 7, because the mixing cone 25 develops above this carrier disc.

Figure 7:
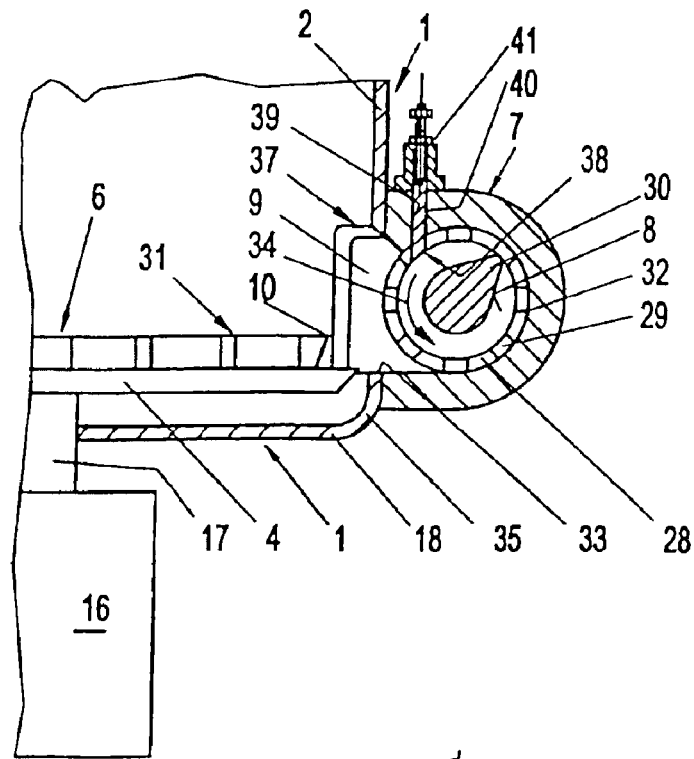
FIG. 7 is a section taken along the line VII—VII of FIG. 6.
Figure 6:
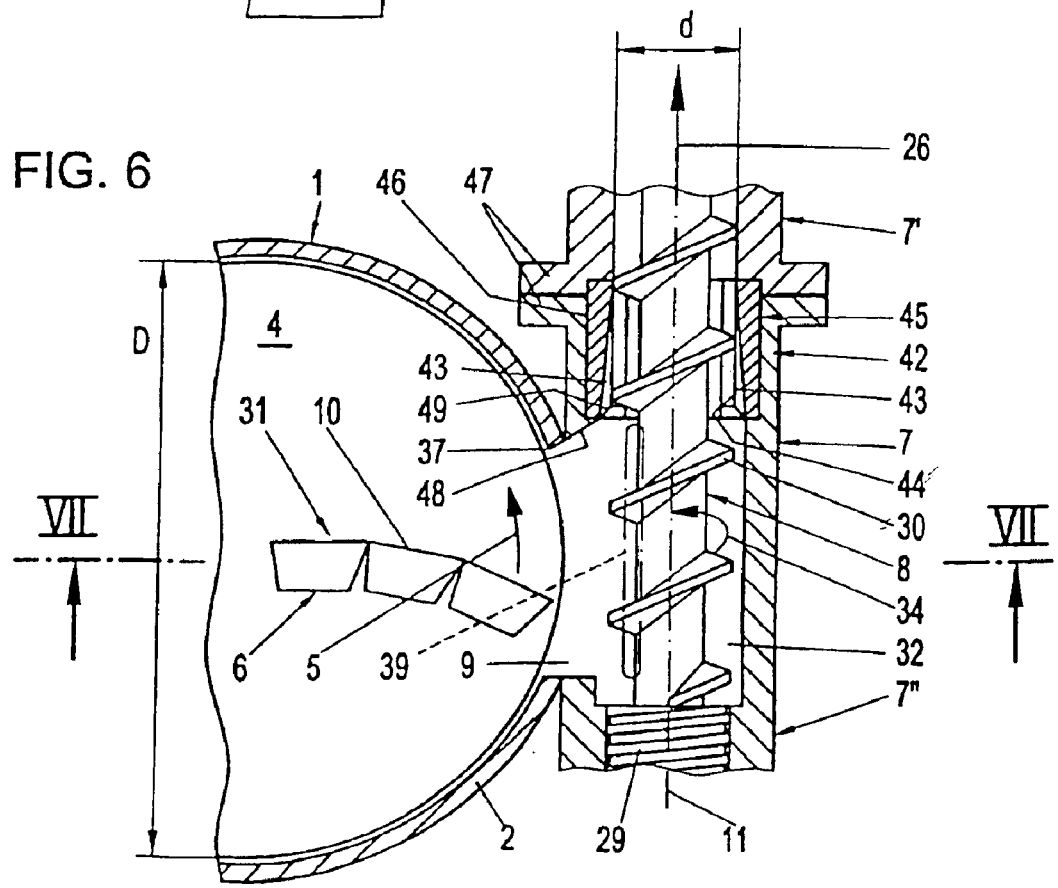
FIG. 6 shows an embodiment similar to FIG. 3, changed however in the region of the intake opening of the screw housing.

In the embodiment according to FIGS. 6 and 7, the housing 7 of the screw 8 is connected tangentially to the receptacle 1 and is in direct connection with the interior of the receptacle 1 via the intake opening 9. The volutions of the screw 8 extend in a direction opposite to the conveyance direction (arrow 26) beyond the intake opening 9 and change there into screw threads 9 acting as a seal, the direction of the screw threads thereof being equal to that of the screw threads 30, the screw threads 29 however having narrower volutions. The screw 8 or, respectively, its housing 9 may be provided with a heating and/or with a cooling means in order to enable one to keep the processed synthetic plastic material at a desired temperature. The substantially rectangular intake opening 9 is formed in the side wall of the screw housing 7 and immediately adjoins the exit opening 37 of the receptacle and is of comparatively large size so that, in the embodiment shown, it extends over about two screw volutions 30. The height of the intake opening 9, measured in axial direction of the receptacle 1, is substantially as great as the diameter of the screw threads 30. This ensures that the screw 8 can take up large quantities of the synthetic plastic material pressed into the intake opening 9 by the tools 6 forming a supply means 31. In the zone of the intake opening 9, there is provided a free space within the screw housing 7 in addition to the screw threads 30, which space is formed by a pocket-like enlargement 32 of the screw housing 7. This enlargement 32 has the shape of a hollow cylinder over large portions of the periphery of the screw housing 7 and extends in an axial direction of the screw 8 over at least one volution 30 of the screw, and in the embodiment shown over about 2.5 screw volutions (FIG. 6). The enlargement 32 is in direct connection with the intake opening 9. The width of the enlargement 32, measured in the peripheral direction of the screw 8, is over its length preferably constant, so that, therefore, the depth of the pocket formed by the enlargement 32 is everywhere substantially of equal size. The enlargement 32 directly adjoins the sealing screw threads 29 and extends in an axial direction of the screw 8 on both sides beyond the intake opening 9. The depth of the enlargement 32, measured in the radial direction of the screw 8, amounts to about 5 to 10% of the diameter of the screw 8. At the lower edge 33 (FIG. 7) of the intake opening 9, the enlargement 32 passes step-less into the intake opening 9, so that there results substantially a horizontal continuation of the top surface of the carrier disc 4. From there, a curved receptacle section 35 leads to its bottom 18. At the upper edge of the intake opening 9, that is, its edge at which the direction of rotation (arrow 34) of the screw 8 is directed towards the receptacle 1, the enlargement has a wall portion 38 that entirely or partially closes the enlargement 32 with respect to the intake opening 9. It is of advantage to construct this wall portion 38 in the manner of an adjustable rib 39 guided within a slotted guide 40 of the screw housing 7 and step-lessly being adjustable by means of adjustment means 41, for example, adjustment screws, towards the screw 8 or away from it. The adjustment region suitably comprises the entire radial depth of the pocket 22 so that the rib 39, in its position in which it is mostly projected towards the screw 13, contacts with its front surface the periphery of the screw volutions 30 and, therefore, constitutes a substantial resistance for the synthetic plastic material taken up by the screw 8, when the screw is turned. In its projected position, in particular in that position in which the rib 39 closes the pocket-like enlargement 32 with respect to the interior of the receptacle 1, the rib constitutes a substantial resistance for the synthetic plastic material moving together with the screw, so that this material is continuously pressed between the volutions 30 of the screw 8 and, therefore, cannot merely rotate together with the screw, but is conveyed by the screw in an axial direction. In the retracted position of the rib 39, however, a portion of the synthetic plastic material taken up by the screw 8 in the intake opening is again conveyed back into the intake opening 9, so that conveyance of the screw 8 in the direction of the arrow 26 is decreased. By selectable intermediate positions of the rib 39, therefore, the conveyance efficiency of the screw 8 can be adjusted by choice between a maximum and a minimum and, therefore, can be adapted to the circumstances given. This in particular is of advantage if the synthetic plastic material is of varying quality, for example of varying density, because in such a manner an overload of the screw 8 and its driving means is avoided.

Immediately neighboring the pocket-like enlargement 32 there is a section 42 of the screw housing 7, which is provided with a plurality of grooves 43 on its inner surface, which grooves are separated from each other by rigid and stationary ribs 44 projecting from the jacket wall of this section. These grooves 43 and ribs 44 extend in the direction 26 of the screw axis 11, although they may also be turned helically around this axis. However, they have always a substantial component of their longitudinal direction extending in the direction of the screw axis 11. The ribs 44 have such a height that the ribs contact the periphery of the screw volutions 30 with their surfaces facing the screw 8 and, therefore, constitute—so to speak—an abutment for the screw 8 in this region 42. The depth of the grooves 43 decreases in a direction away from the pocket-like enlargement 32, preferably continuously and step-lessly. Suitably, the grooves 43 have a depth at their ends in which the conveyed plastic material enters that is equal to the depth of the enlargement 32 measured in radial direction, so that at the transition between the enlargement 32 and the grooves 43 there is no step. However, each rib 44 constitutes such a step. At the other front end of the section 42, the grooves 43 change smoothly into the screw outer diameter, so that there the bottom of the grooves 43 reaches the top surface of the ribs 44. The side walls of the grooves 43 have a catching action on the plastic material conveyed by the screw 8. Preferably, that side wall of the respective groove 43 that, when seen in direction of rotation of the screw 8 (arrow 34), follows is inclined opposite to the direction of rotation of the screw. Therefore, the ribs disposed between the grooves are of about trapezoidal cross-section. The width of the grooves 43 suitably is the same for all grooves, and this also is true for the ribs 44. The ratio between the width of the grooves 43 and the width of the ribs 44, measured in a peripheral direction of the screw 8, amounts to 0.5:1 to 2:1. It is of advantage to dispose the grooves 43 in a separate member of the screw housing 7 that is formed as an easily exchangeable sleeve 45 (FIG. 6). This sleeve is inserted into a cylindrical recess 46 of the screw housing 7 and is secured therein against rotation, for example by means of a wedge or the like, not shown. The sleeve 45 constitutes a wear member and, therefore, consists of wear-resistant material, in particular hard metal. In order to enable one to easily exchange the sleeve 45, it is disposed between two sections 7', 7" of the screw housing 7 screwed to each other at flanges 47.

The downstream edge of the intake opening 9 is formed by an inclined surface 48, preferably conically, and smoothly changes into the front end of the ribs 44 or of the grooves 43, respectively. This upstream-side front end 49 of the ribs 44 can be chamfered, preferably in alignment with the inclined surface 48, which favors the intake of the synthetic plastic material into the volutions of the screw 8.

In most plants in which a plasticizing screw is connected to a receptacle increased in the inventive manner, it has been shown by tests to be of advantage if the plasticizing screw 8 in its section neighboring the exit opening 15 has a depth of the volutions that amounts to at least 5%, preferably more than 7%, of the screw diameter. Particularly favorable values have been shown by tests to be in the region of 7.5% to 8.5% of the screw diameter.

What is claimed is:

1. Apparatus for pre-treatment and subsequent plastification or agglomeration of synthetic plastic material comprising a receptacle that has an intake opening for the material to be processed, and in which at least one circulating comminuting and/or mixing tool is disposed, whereby the material preprocessed within the receptacle is fed into a housing of a screw plasticizing or agglomerating the material, the housing bang connected to the receptacle, wherein a diameter (I) of the receptacle is kept in the following relation with respect to a diameter (d) of the screw:

$$D = 10 \cdot \sqrt[3]{K \cdot d^2}, \text{ wherein}$$

D is the inner diameter of the circular-cylindrical receptacle in mm or the inner diameter in mm of a fictitious circular cylindrical receptacle having the same capacity and the same height, d is the diameter of the screw in mm and K is a constant which is greater than or equal to 190.

2. Apparatus according to claim 1 wherein K is greater than 200.

3. Apparatus according to claim 1 wherein an axis of the screw is disposed radially or as a secant with respect to a cross-section of the receptacle.

4. Apparatus according to claim 1 wherein an axis of the screw is disposed tangentially with respect to a cross-section of the receptacle, the housing of the screw having a side wall that has an intake opening for the material to be received by the screw, and wherein one end of the screw is connected to a drive means and another end of the screw conveys the material towards an exit opening at a front end of the housing.

5. Apparatus according to claim 4 wherein a section of the screw neighboring the intake opening has volutions of a greater depth when compared to the depth of volutions at a remaining section of the screw.

6. Apparatus according to claim 1 wherein the housing of the screw includes an intake opening for the material to be received by the screw and an exit opening, and wherein a section of the screw neighboring the exit opening has a depth of the volutions that amounts to at least 5% of the screw diameter.

7. Apparatus according to claim 6 wherein the depth of the volutions is more than 7% of the screw diameter.

8. Apparatus according to claim 1 wherein the screw housing has a pocket-like enlargement in the region of an intake opening of the housing, which enlargement constitutes an additional free space for the synthetic plastic material to be introduced into the housing, wherein at an edge of the intake opening at which the direction of rotation of the screw is directed towards the receptacle a rib is provided which completely or partially closes this enlargement with respect to the intake opening.

9. Apparatus according to claim 8 wherein the rib is an adjustable rib.

10. Apparatus according to claim 1 wherein the plastic material comprises thermoplastic waste material to be recycled.

11. Apparatus according to claim 1 wherein the screw comprises an extruder screw.

12. Apparatus according to claim 4 including an extruder head at the exit opening of the housing.

13. Apparatus according to claim 7 wherein the depth of the volutions is 7.5% to 8.5% of the screw diameter.

* * * * *